United States Patent
Chang

(10) Patent No.: US 9,032,135 B2
(45) Date of Patent: May 12, 2015

(54) DATA PROTECTING METHOD, MEMORY CONTROLLER AND MEMORY STORAGE DEVICE USING THE SAME

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 201 days.

(21) Appl. No.: 13/491,607

(22) Filed: Jun. 8, 2012

(65) Prior Publication Data

US 2013/0262748 A1     Oct. 3, 2013

(30) Foreign Application Priority Data

Apr. 3, 2012 (TW) ............................. 101111863 A

(51) Int. Cl.
    *G06F 12/08*     (2006.01)
    *G06F 12/14*     (2006.01)
    *G06F 12/02*     (2006.01)

(52) U.S. Cl.
    CPC .......... *G06F 12/145* (2013.01); *G06F 12/0246* (2013.01); *G06F 2212/7201* (2013.01)

(58) Field of Classification Search
    CPC ... G06F 12/04; G06F 9/30043; G06F 9/3816; G06F 12/109; G06F 12/10; G06F 12/1027; G06F 3/0644; G06F 9/5077; G06F 3/0607
    USPC ................................................. 711/173, 201
    See application file for complete search history.

(56) References Cited

U.S. PATENT DOCUMENTS

| | | | |
|---|---|---|---|
| 6,345,368 B1 * | 2/2002 | Bergsten ........................... | 714/11 |
| 6,839,827 B1 * | 1/2005 | Beardsley et al. ............. | 711/206 |
| 7,478,221 B1 * | 1/2009 | Karr et al. ....................... | 711/203 |
| 8,086,585 B1 * | 12/2011 | Brashers et al. ............... | 707/705 |
| 2002/0194451 A1 * | 12/2002 | Mukaida et al. ............... | 711/203 |
| 2005/0144418 A1 * | 6/2005 | Kita ................................. | 711/203 |
| 2006/0129749 A1 * | 6/2006 | Nakanishi et al. ............. | 711/103 |
| 2007/0002612 A1 * | 1/2007 | Chang et al. ............... | 365/185.01 |
| 2007/0136553 A1 * | 6/2007 | Sinclair .......................... | 711/203 |

(Continued)

FOREIGN PATENT DOCUMENTS

TW          200809594          2/2008

OTHER PUBLICATIONS

"Office Action of Taiwan Counterpart Application", issued on Aug. 12, 2014, p. 1-p. 9, in which the listed reference was cited.

(Continued)

*Primary Examiner* — Kevin Verbrugge
(74) *Attorney, Agent, or Firm* — Jianq Chyun IP Office

(57) ABSTRACT

A data protecting method for a rewritable non-volatile memory module having physical blocks is provided, a plurality of logical block addresses is mapped to a part of the physical blocks. The method includes, configuring a plurality of virtual block addresses to map to the logical block addresses, grouping at least one virtual block address into a virtual block address area, and allocating the virtual block address area to an application. The method also includes, receiving an access command which is configured to instruct accessing a first virtual block address from the application. The method also includes: determining whether the first virtual block address belongs to the virtual block address area, if not, sending an error message to the application. Accordingly, the method can effectively prevent an application from accessing the data which can not be accessed by the application program.

14 Claims, 14 Drawing Sheets

(56) References Cited

U.S. PATENT DOCUMENTS

| | | | |
|---|---|---|---|
| 2007/0150690 A1* | 6/2007 | Chen et al. | 711/170 |
| 2007/0214310 A1* | 9/2007 | Ishimoto et al. | 711/103 |
| 2009/0106486 A1* | 4/2009 | Kim et al. | 711/103 |
| 2010/0191779 A1* | 7/2010 | Hinrichs | 707/822 |
| 2011/0016261 A1* | 1/2011 | Lin et al. | 711/103 |
| 2011/0252191 A1* | 10/2011 | Chang | 711/105 |
| 2012/0005451 A1* | 1/2012 | Lee et al. | 711/203 |
| 2012/0005668 A1* | 1/2012 | Serizawa et al. | 718/1 |
| 2012/0072641 A1* | 3/2012 | Suzuki et al. | 711/103 |
| 2013/0031317 A1* | 1/2013 | Ryu et al. | 711/154 |
| 2013/0117520 A1* | 5/2013 | Ryu | 711/165 |
| 2013/0166839 A1* | 6/2013 | Burton et al. | 711/114 |

OTHER PUBLICATIONS

"Office Action of Taiwan Couterpart Application TW101111863," issued on Dec. 24, 2014, p. 1-p. 10.

* cited by examiner

| 702(0) | LBA(0) |
|--------|--------|
| 702(1) | LBA(1) |
| ⋮ | |
| 702(F) | LBA(F) |

| | |
|---|---|
| 802(0) | LBA(0) |
| 802(1) | LBA(1) |
| 802(2) | LBA(2) |
| 802(3) | LBA(A) |
| 802(4) | LBA(A+1) |
| 802(5) | LBA(A+2) |

FIG. 10

DATA PROTECTING METHOD, MEMORY CONTROLLER AND MEMORY STORAGE DEVICE USING THE SAME

CROSS-REFERENCE TO RELATED APPLICATION

This application claims the priority benefit of Taiwan application serial no. 101111863, filed on Apr. 3, 2012. The entirety of the above-mentioned patent application is hereby incorporated by reference herein and made a part of this specification.

BACKGROUND

1. Technical Field

The present invention generally relates to a data protecting method and more particularly to the data protecting method for preventing an application from accessing a data which does not belong to the application, and a memory controller and a memory storage device using the same.

2. Description of Related Art

Along with the widespread of digital cameras, cell phones, and MP3 in recently years, the consumer' demand to storage media has increased drastically. A rewritable non-volatile memory module (e.g. flash memory) is one of the most adaptable storage media to portable electronic products (e.g. digital cameras mentioned above) due to its many characteristics such as data non-volatility, low power consumption, small volume, non-mechanical structure, and fast access speed.

In general, the rewritable non-volatile memory module includes a plurality of physical blocks which are mapped to a plurality of logical blocks. The logical blocks are provided for one or more applications to use. Nevertheless, the applications access the physical blocks through issuing commands to access the logical blocks. If an application issues a command for accessing the logical blocks belonging to other applications, the accessed data belonging to other applications may be modified, thus the security of the data is affected. Therefore, the issue of how to prevent an application from accessing data that does not belong to the application is the concern for those skilled in the art.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

According to the exemplary embodiments of the invention, a data protecting method, and a memory controller and a memory storage device using the same are provided, which can effectively prevent an application from accessing the data which is unauthorized to be accessed.

According to an exemplary embodiment of the invention, a data protecting method is provided, which is used on a rewritable non-volatile memory module. The rewritable non-volatile memory module includes a plurality of physical blocks, and a plurality of logical block addresses is configured to map to a part of the physical blocks. The data protecting method comprises: configuring a plurality of virtual block addresses to map to the logical block addresses; and grouping at least one virtual block address into a first virtual block address area which is allocated to a first application, wherein the first virtual block address area is mapped to a first logical block address area. The data protecting method also includes: receiving a first access command from the first application, the first access command instructs accessing a first virtual block address of the virtual block addresses; and determining whether the first virtual block address belongs to the first virtual block address area. And, if the first virtual block address does not belong to the first virtual block address area, an access error message is sent to the first application.

From another point of view, according to an exemplary embodiment of the invention, a memory storage device is provided, which includes a connector, a memory controller and the rewritable non-volatile memory module. The connector is configured to couple to a host system. The rewritable non-volatile memory module includes a plurality of physical blocks, wherein a plurality of logical block addresses is configured to map to a part of the physical blocks. The memory controller is coupled to the connector and the rewritable non-volatile memory module. The memory controller is configured to group at least one logical block address of the logical block addresses into a first logical block address area which is allocated to a first application. The memory controller is also configured to receive a first access command from the first application. The first access command is used to instruct accessing at least one first logical block address of the logical block addresses. The memory controller is also configured to determine whether the first logical block address belongs to the first logical block address area, if not, the memory controller is configured to send an access error message to the first application.

From another point of view, according to an exemplary embodiment of the invention, a memory controller is also provided, configured to control a rewritable non-volatile memory module. The rewritable non-volatile memory module includes a plurality of physical blocks, wherein a plurality of logical block addresses is configured to map to a part of the physical blocks. The memory controller includes a host interface, a memory interface, and a memory management circuit. Wherein, the host interface is configured to couple to a host system. The memory interface is coupled to the rewritable non-volatile memory module. The memory management circuit is coupled to the host interface and memory interface, configured to configure a plurality of virtual block addresses to map to the logical block addresses. The memory management circuit is also configured group at least one virtual block address into a first virtual block address area which is allocated to a first application. The first virtual block address area is mapped to the first logical block address area. The memory management circuit is also configured receive a first access command from the first application. The first access command instructs accessing a first virtual block address of the virtual block addresses. The memory management circuit also determines whether the first virtual block address belongs to the first virtual block address area. If the first virtual block address does not belong to the first virtual block address area, the memory management circuit is configured to send an access error message to the first application.

Base on the above, the exemplary embodiments of the invention provided a data protecting method, and a memory controller and a memory storage device using the same to prevent an application from accessing the logical blocks which belongs to other applications.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 7 illustrates an example of the accessing block table belonging to the first application according to the first exemplary embodiment.

FIG. 10 is a diagram illustrating an example of the accessing block table according to the exemplary embodiment of the FIG. 9.

DESCRIPTION OF THE EMBODIMENTS

Figure 1A:
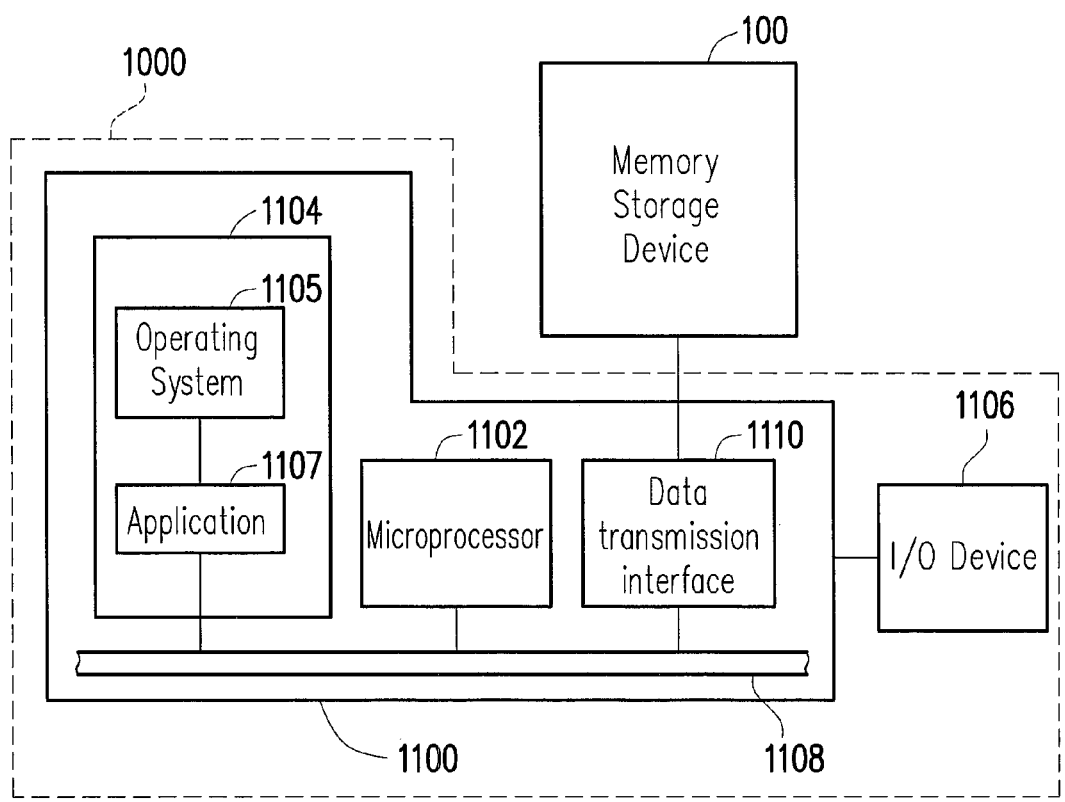
FIG. 1A illustrates a host system and a memory storage device according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Generally speaking, a memory storage device (also referred as a memory storage system) includes a rewritable non-volatile memory module and a controller (also referred to as a control circuit). The memory storage device is usually used together with a host system so that the host system can write data into or read data from the memory storage device.

FIG. 1A illustrates a host system and a memory storage device according to the first exemplary embodiment of the invention.

Figure 1B:
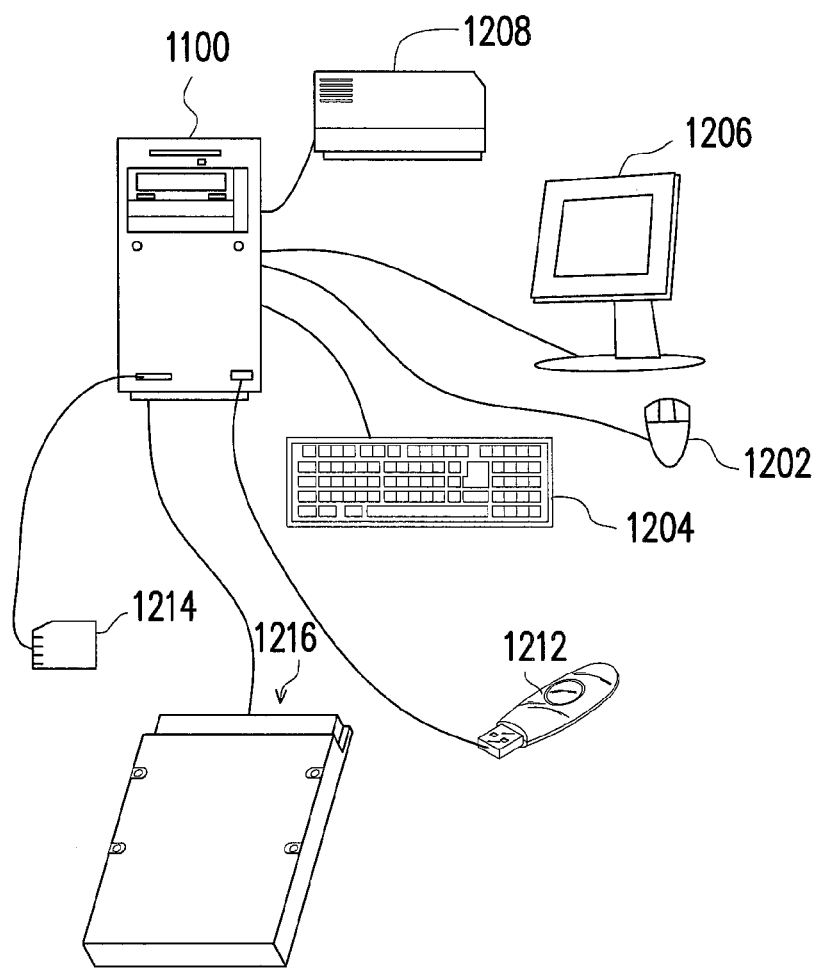
FIG. 1B is a diagram illustrating a computer, an input/output (I/O) device, and a memory storage device according to the first exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The microprocessor 1102 executes an operating system 1105 and an application 1107 which are loaded in the RAM 1104, so the host system 1000 is enabled to provide the corresponding functions according to user operations. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, for the I/O device 1106 may further include other devices.

In the exemplary embodiment of the invention, the memory storage device 100 is coupled to other components of the host system 1000 through the data transmission interface 1110. Through the operations of the microprocessor 1102, the RAM 1104, and the I/O device 1106, data can be written into or read from the memory storage device 100. For example, the memory storage device 100 may be a rewritable non-volatile memory storage device, such as the flash drive 1212, the memory card 1214, or the solid state drive (SSD) 1216 illustrated in FIG. 1B.

Figure 1C:
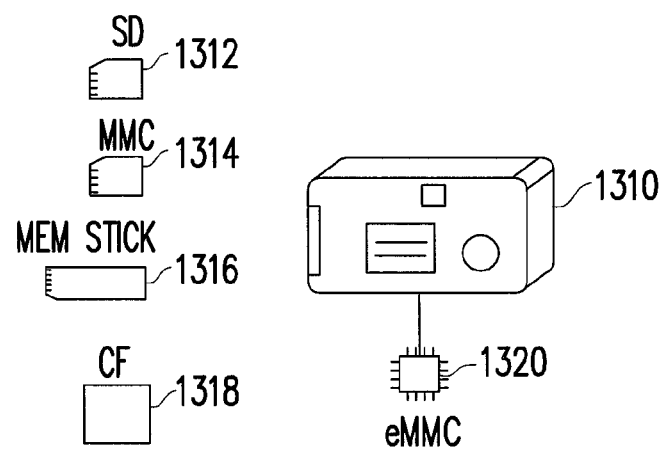
FIG. 1C is a diagram illustrating a host system and a memory storage device according to the first exemplary embodiment of the invention.

Generally speaking, the host system 1000 can be substantially any system that works together with the memory storage device 100 to store data. Even though in the present exemplary embodiment, the host system 1000 is described as a computer system, in another exemplary embodiment of the invention, the host system 1000 may also be a digital camera, a video camera, a communication device, an audio player, or a video player. For example, if the host system is a digital camera (video camera) 1310, the rewritable non-volatile memory storage device may be a secure digital (SD) card 1312, a multi media card (MMC) 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be noted that the eMMC is directly coupled to the motherboard of the host system.

Figure 2:
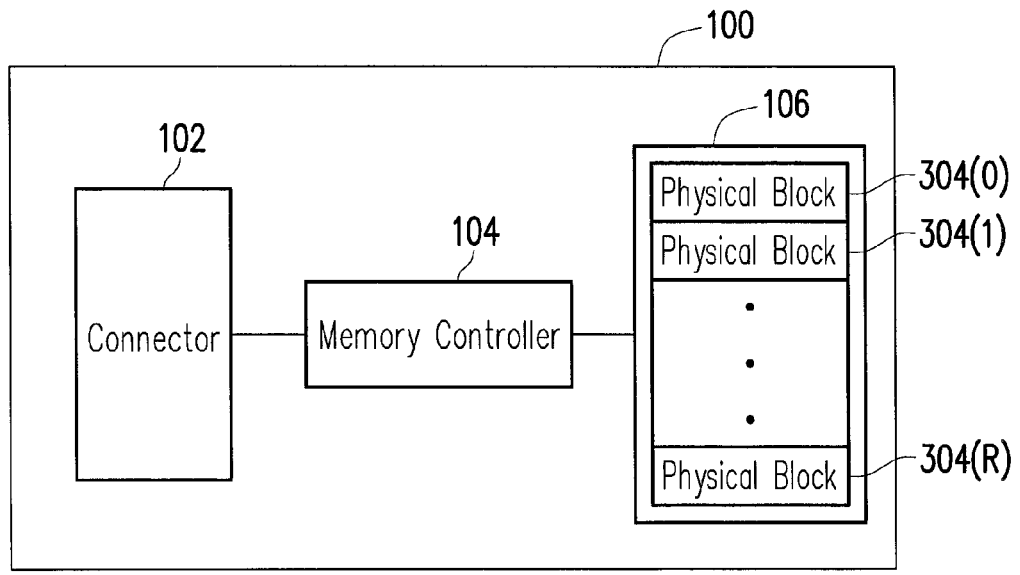
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatile memory module 106.

In the present exemplary embodiment of the invention, the connector 102 is compatible with a SD interface standard.

However, it should be understood that the exemplary embodiments of the invention are not limited thereto. The connector 102 also has the capability to be compatible with the standards of a Parallel Advanced Technology Attachment (PATA), an Institute of Electrical and Electronic Engineers (IEEE) 1394, a Peripheral Component Interconnect Express (PCI-e), an Universal serial bus (USB), a Serial Advanced Technology Attachment (SATA), a MS interface, a MMC interface, a CF interface, an Integrated Device electronics (IDE), or any other suitable interfaces.

The memory controller 104 executes a plurality of logic gates or control instructions implemented in a hardware form or a firmware form, and performs data writing, reading, erasing, or other various data operations on the rewritable non-volatile memory module 106 according to instructions of the host system 1000.

The rewritable non-volatile memory module 106 is coupled to the memory controller 104 and used for storing data written by the host system 1000. The rewritable non-volatile memory module 106 contains a plurality of physical blocks 304(0)~304(R). For example, the physical blocks 304(0)~304(R) may belong to the same memory die or different memory dies. Each physical block contains a plurality of physical pages, and each physical page contains at least one physical sector, wherein the physical pages belonging to the same physical block can be individually written but have to be erased all together. For example, each physical block is composed of 128 physical pages, and each physical page contains 8 physical sectors. In other words, if each physical sector is 512 bytes, the size of each physical page will be 4 KB. However, it should be understood that the exemplary embodiments of the invention are not limited thereto. Each physical block may also be composed of 64 physical pages, 256 physical pages, or any other number of physical pages.

To be specific, physical block is the smallest unit for erasing data. Namely, each physical block contains the least number of the memory cells that are to be erased together. Physical page is the smallest unit for programming data. Namely, the physical page is the smallest unit for writing data. However, in another exemplary embodiment of the invention, the smallest unit for writing data may also be the physical sector or other unit. Each physical page usually includes a data bit area and a redundancy bit area. The data bit area is used for storing user data, and the redundancy bit area is used for storing system data (For example, an error checking and correcting code.)

In this exemplary embodiment, the rewritable non-volatile memory module 106 is Multi-Level Cell (MLC) NAND flash memory module, and each memory cell stores at least 2 bits. However, the exemplary embodiments of the invention are not limited thereto. The rewritable non-volatile memory module 106 may also be a Single Level Cell (SLC) NAND flash memory module, a Trinary Level Cell (TLC) NAND flash memory module, any other flash memory module, or any other memory modules that having the same characteristics.

Figure 3:
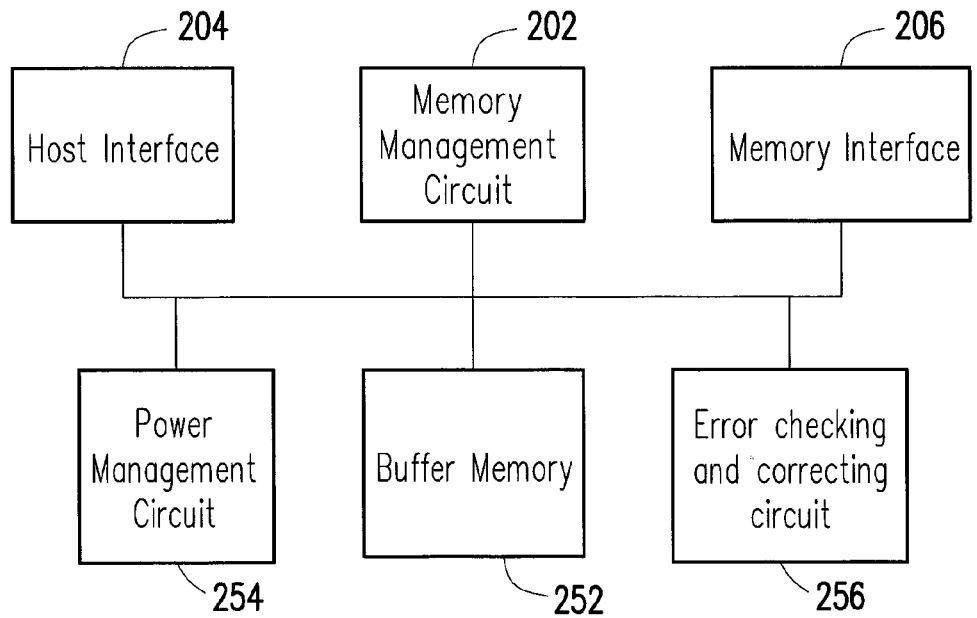
FIG. 3 is a schematic block diagram of a memory controller according to the first exemplary embodiment of the invention.

FIG. 3 is a schematic block diagram of a memory controller according to the first exemplary embodiment of the invention.

Referring to FIG. 3, the memory controller 104 includes a memory management circuit 202, a host interface 204, and a memory interface 206.

The memory management circuit 202 controls the operation of the memory controller 104. To be specific, the memory management circuit 202 has a plurality of control instructions. When the memory storage device 100 is in operation, the control instructions are executed for the data writing, reading, erasing, and any other data operations.

In this exemplary embodiment of the invention, the control instructions of the memory management circuit 202 are implemented in a firmware form. For example, the memory management circuit 202 has a microprocessor unit (not shown) and a read-only memory (ROM) (not shown), and the control instructions are burnt into the ROM. When memory storage device 100 is in operation, the control instructions are executed by the microprocessor unit for the data writing, reading, erasing, and other operations.

In other one exemplary embodiments of the invention, the control instructions of the memory management circuit 202 are stored in a specific area (for example, a system area exclusively used for storing system data in a memory module) of the rewritable non-volatile memory module 106 as program codes. In addition, the memory management circuit 202 has a microprocessor unit (not shown), a ROM (not shown), and a RAM (not shown). Particularly, the ROM has boot codes. When the memory controller 104 is enabled, the microprocessor unit will first execute the boot codes to load the control instructions from the rewritable non-volatile memory module 106 into the RAM of the memory management circuit 202. After that, the microprocessor unit runs the control instructions in order to proceed with data writing, reading, erasing, or any other data operations.

Additionally, in another exemplary embodiment of the invention, the control instructions of the memory management circuit 202 are implemented in a hardware form. For example, a memory management circuit 202 includes a microcontroller, a memory management unit, a memory writing unit, a memory reading unit, a memory erasing unit, and data processing unit. The memory management unit, the memory writing unit, the memory reading unit, the memory erasing unit, and data processing unit are coupled to the microcontroller. The memory management unit is configured to manage the physical blocks of the rewritable non-volatile memory module 106; the memory writing unit is configured to issue a write command for the data to be written into the rewritable non-volatile memory module 106; the memory reading unit is configured to issue a read command for data to be read from the rewritable nonvolatile memory module 106; the memory erasing unit is configured to issue an erase command for data to be erased from the rewritable non-volatile memory module 106; and the data processing unit is configured to process the data which are to be written to or read from the rewritable non-volatile memory module 106

The host interface 204 is coupled to the memory management circuit 202 and configured for receiving and identifying the commands and data from the host system 1000. In other words, the commands and data from the host system 1000 are sent to the memory management circuit 202 via the host interface 204. In this embodiment of the invention, the host interface 204 is compatible with SD standard. However, the exemplary embodiments of the invention are not limited thereto. The Host interface 204 may also has the capability to be compatible with PATA standard, IEEE 1394 standard, PCI-Express standard, USB standard, SATA standard, MS standard, MMC standard, CF standard, IDE standard, or any other suitable data transmission standards.

The memory interface 206 is coupled to the memory management circuit 202 and configured for accessing the rewritable non-volatile memory module 106. In other words, the memory interface 206 converts the data into an acceptable format for the rewritable non-volatile memory module 106 in order to write the data into the rewritable non-volatile memory module 106.

In an exemplary embodiment of the invention, the memory controller 104 further comprises a buffer memory 252, a power management circuit 254, and an error checking and correcting circuit (ECC Circuit) 256.

The buffer memory 252 is coupled to the memory management circuit 202 and configured for temporarily storing the data and commands from the host system 1000 or the data from the rewritable non-volatile memory module 106.

The power management circuit 254 is coupled to the memory management circuit 202 and configured for controlling the power supply of the memory storage device 100

The ECC circuit 256 is coupled to the memory management circuit 202 and configured for executing an ECC procedure to ensure the data correctness. In detail, when the memory management circuit 202 receives a write command from the host system 1000, the ECC circuit 256 generates a corresponding error checking and correcting code (ECC Code) for to the data corresponding to the write command. And then the memory management circuit 202 writes the data corresponding to the write command and its ECC Code into the rewritable non-volatile module 106. Subsequently, when the memory management circuit 202 reads the data from the rewritable non-volatile memory module 106, it simultaneously reads the corresponding ECC code, and the ECC circuit 256 executes the ECC procedure on the read data based on the ECC code.

Figure 4:
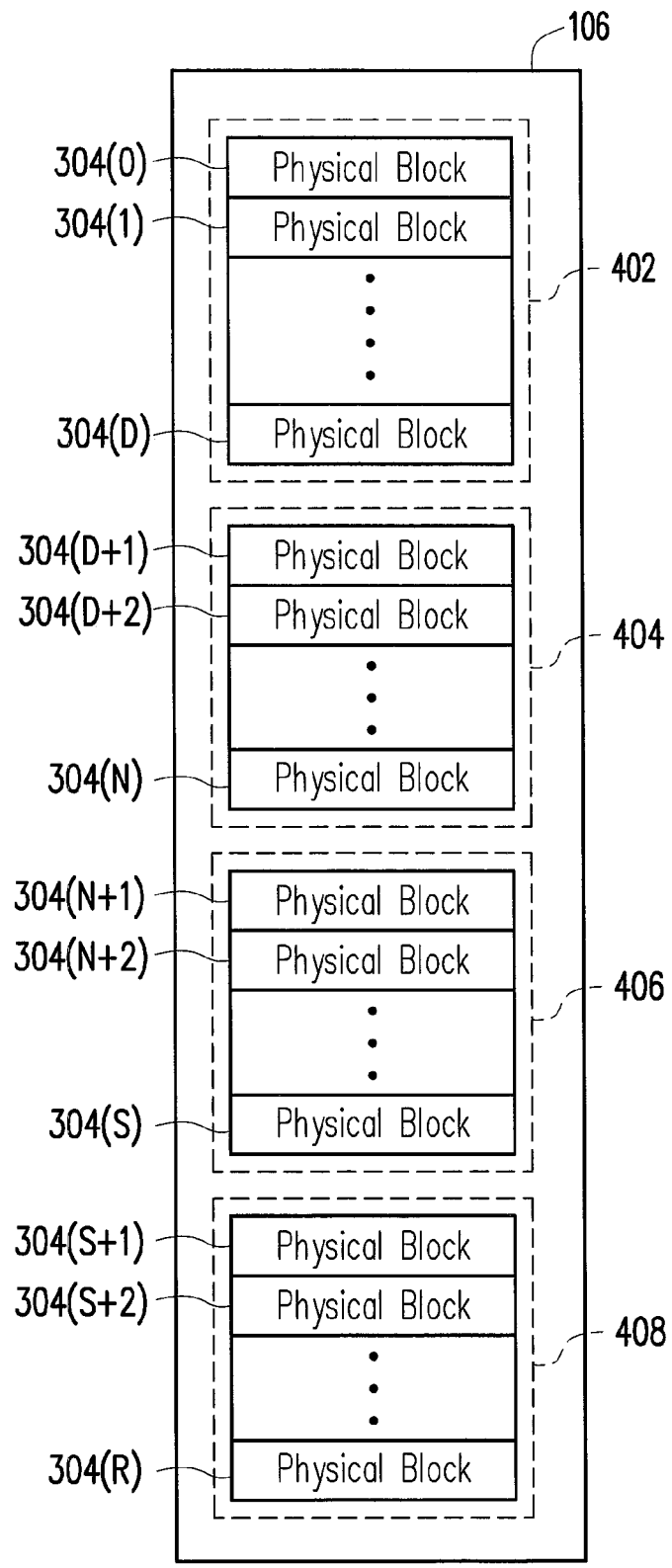
FIGS. 4 and 5 are diagrams illustrating the models of how the rewritable non-volatile memory module is managed according to the first exemplary embodiment of the invention.
Figure 5:
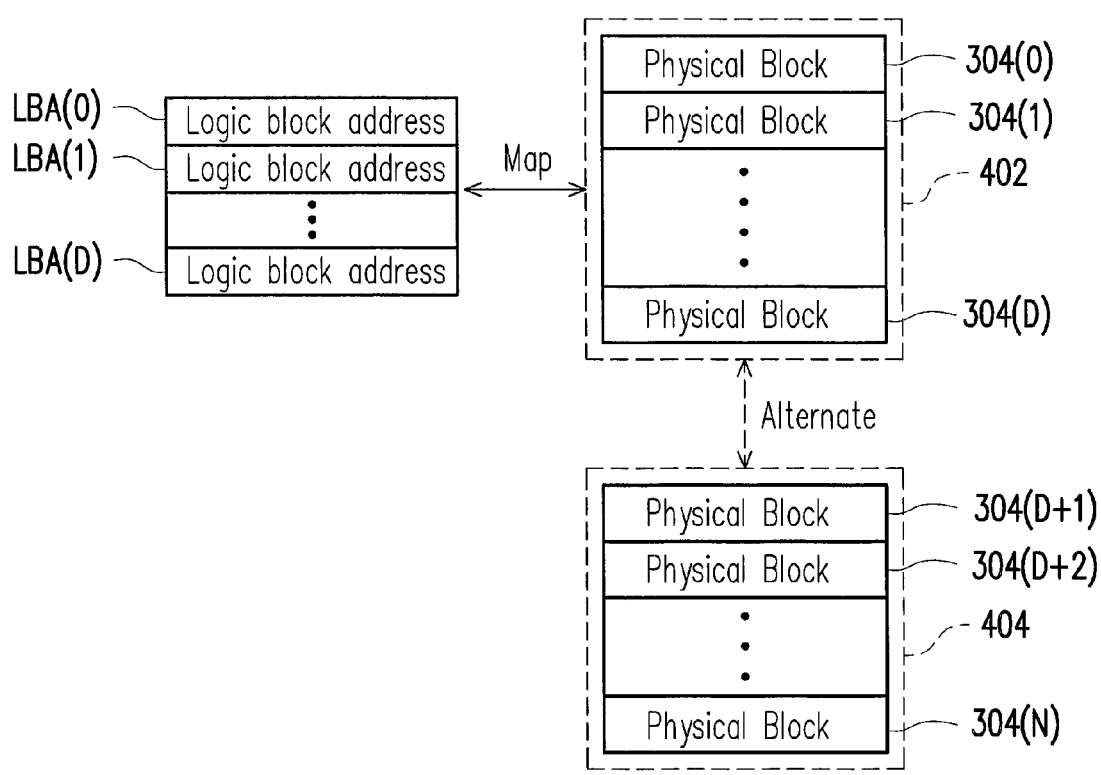

FIGS. 4 and 5 is a diagram illustrating the models of how the rewritable non-volatile memory module is managed according to the first exemplary embodiment of the invention.

During the operation of the physical blocks of the rewritable non-volatile memory module 106, the terms like "select", "substitute", "group", "alternate", and any other terms for the operation of the physical blocks are performed in a logical concept. In other words, the actual locations of the physical blocks in the rewritable non-volatile memory module do not change; instead the operations are logically performed on the physical blocks of the rewritable non-volatile memory module.

Referring to FIG. 4, the memory controller 104 logically groups the physical blocks 304(0)~304(R) into a data area 402, a spare area 404, a system area 406, and a replacement area 408.

The physical blocks of the data area 402 and the spare area 404 are used for storing the data from the host system 1000. In detail, the physical blocks in the data area 402 already contain data, and the physical blocks of the spare area 404 are used to substitute the physical blocks of the data area 402. Therefore, the physical blocks of the spare area 404 are blank or available physical blocks, which are not recorded with data or labeled as invalid data. Namely, erasing operations have been performed on the physical blocks in the spare area 404, or when the physical blocks in the spare area 404 are selected for storing data, erasing operations are first performed on the selected physical blocks. Therefore, the physical blocks of the spare area 404 are available physical blocks.

The physical blocks logically belonging to the system area 406 are used for recording system data, which includes the manufacturer and model of the memory die, the number of the physical blocks in the memory die, and the number of the physical pages in each physical block.

The physical blocks logically belonging to the replacement area 408 are replacement physical blocks. For example, the factory default of the rewritable non-volatile memory module sets aside 4% of the physical block for replacement. In other words, when the physical blocks are damaged within the data area 402, the spare area 404, and the system area 406, the set aside physical block of the replacement area 408 is used for replacing any damaged physical blocks (referred to as bad block). In the occurrences of a physical block being damage while there are still functional physical blocks in the replacement area 408, the memory controller 104 will extract the functional physical blocks from the replacement area 408 to replace the damaged physical blocks. In the occurrences of the physical block being damage while there are no functional physical blocks in the replacement area 408, the memory controller 104 will declare the whole memory storage device 100 to a write protect mode and is no longer able to write in any data.

Particularly, the number of the physical blocks in the data area 402, the spare area 404, the system area 406, and the replacement area 408 changes according to the different memory specifications. Furthermore, during the operation of the memory storage device 100, the grouping relationship of the physical blocks associated to the data area 402, the spare area 404, the system area 406, and the replacement area 408 changes dynamically. For example, when the damaged physical blocks of the spare area are replaced by the physical blocks of the replacement area, then the former physical blocks originally in the replacement area are associated to the spare area.

Referring to FIG. 5, as described above, the physical blocks of the data area 402 and the spare area 404 are alternatively used to store data written by the host system 1000. In this exemplary embodiment of the invention, the memory controller 104 configures a plurality of logical block addresses LBA(0)~LBA(D) to benefit the data accessing of the physical blocks where data is stored in the aforementioned alternating way. For example, when the memory storage device 100 is formatted by the file system (i.e. FAT 32) of the operating system 1110, the logical block addresses LBA(0)~LBA(D) are respectively mapped to the physical blocks 304(0)~304(D) of the data area 402. At this point, the memory management circuit 202 creates a logical block addresses—physical block mapping table to record the mapping relationship between the logical block addresses and physical blocks.

In this exemplary embodiment of the invention, the memory management circuit configures a plurality of virtual block addresses to map to the logical block addresses LBA(0)~LBA(D). The applications installed in the host system 1000 are able to access the logical block addresses LBA(0)~LBA(D) through the virtual block addresses, and then access the physical blocks 304(0)~304(D). Particularly, the memory management circuit 202 groups the virtual block addresses into a plurality of areas, which are respectively applied as the accessing areas exclusively for a plurality of applications. For example, the applications includes an application used on small payments of shops, or an application of purchasing proof of the tickets for transportations. However, the exemplary embodiments of the invention are not limited to the usage of these applications.

Figure 6:
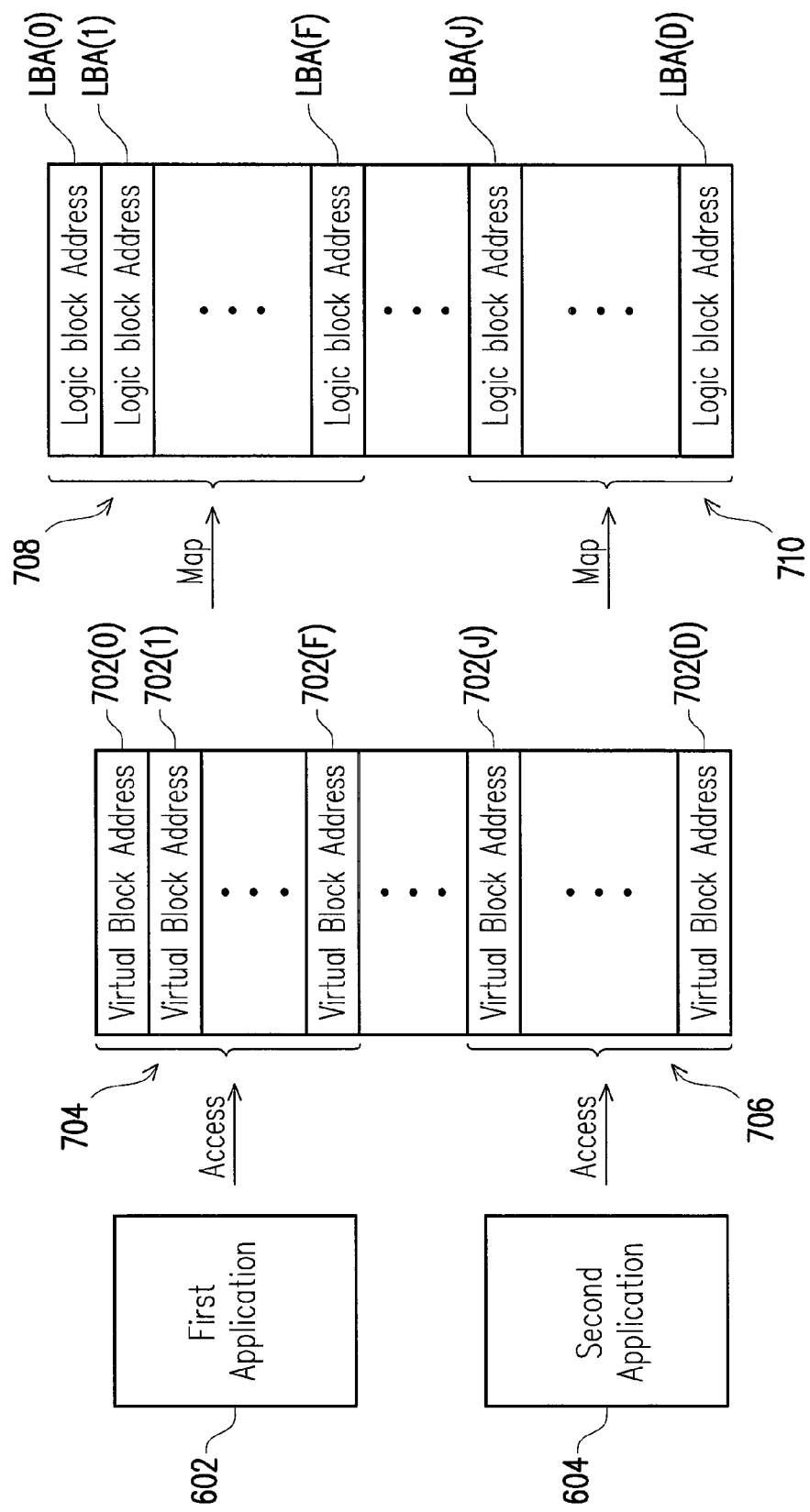
FIG. 6 is a diagram illustrating the virtual block addresses accessing by the application according the first exemplary embodiment.

FIG. 6 is a diagram illustrating the virtual block addresses accessing by the applications according to the first exemplary embodiment.

Referring to FIG. 6, a first application 602 and a second application 604 are installed in the host system 1000. The memory management circuit 202 configures the virtual block addresses 702(0)~702(D) to map to the logical block addresses LBA(0)~LBA(D). The memory management circuit 202 groups at least one virtual block address of the virtual block addresses 702(0)~702(D) into a first virtual block address area. Also, the memory management circuit 202 groups at least one logical block address of the logical block addresses LBA(0)~LBA(D) into a first logical block address area. For example, the memory management circuit 202 groups the virtual block addresses 702(0)~702(F) (also referring as third virtual block addresses) into a first virtual block address area 704. Furthermore, the memory management circuit 202 groups the logical block addresses LBA(0)~LBA (F) (also referring as third logical block addresses) into a first logical block address area 708. Wherein, the number of the virtual block addresses 702(0)~702(F) equals to the number of the logical block addresses LBA(0)~LBA(F). Additionally, the memory management circuit 202 maps the virtual block addresses 702(0)~702(F) to the logical block addresses LBA(0)~LBA(F). In other words, the first virtual block address area 704 is mapped to the first logical block address area 708. Lastly, the memory management circuit 202 allocates the first virtual block address area 704 to the first application 602.

Similarly, the memory management circuit 202 groups the virtual block addresses 702(J)~702(D) into a second virtual block address area 706, and groups the logical block addresses LBA(J)~LBA(D) into a second logical block address area 710. The memory management circuit 202 maps the virtual block addresses 702(J)~702(D) to the logical block addresses LBA (J)~LBA (D). In other words, the second virtual block address area 706 is map to the second logical block address area 710. The memory management circuit 202 allocates the second virtual block address area 706 to the second application 604.

Particularly, after the first application 602 issues an access command (also referred as a first access command) to the memory management circuit 202 to access a virtual block address (also referred as a first virtual block address). The memory management circuit 202 determines whether the virtual block address which are to access by the first application 602 belongs to the first virtual block address area 704. If not, the memory management circuit 202 sends an access error message to the first application 602. If the virtual block address which is to access by the first application belongs to the first virtual block address area 704, the memory management circuit 202 would locate the logical block address (also referred as a first logical block address) which the first virtual block address is mapped to, and access the physical blocks which the first logical block address is mapped to according to the first access command.

In detail, the memory management circuit 202 creates an accessing block table which belongs to the first application 602. The accessing block table is used to determine whether the virtual block addresses which are to access by the first application 602 belong to the first virtual block address area 704.

Figure 7:
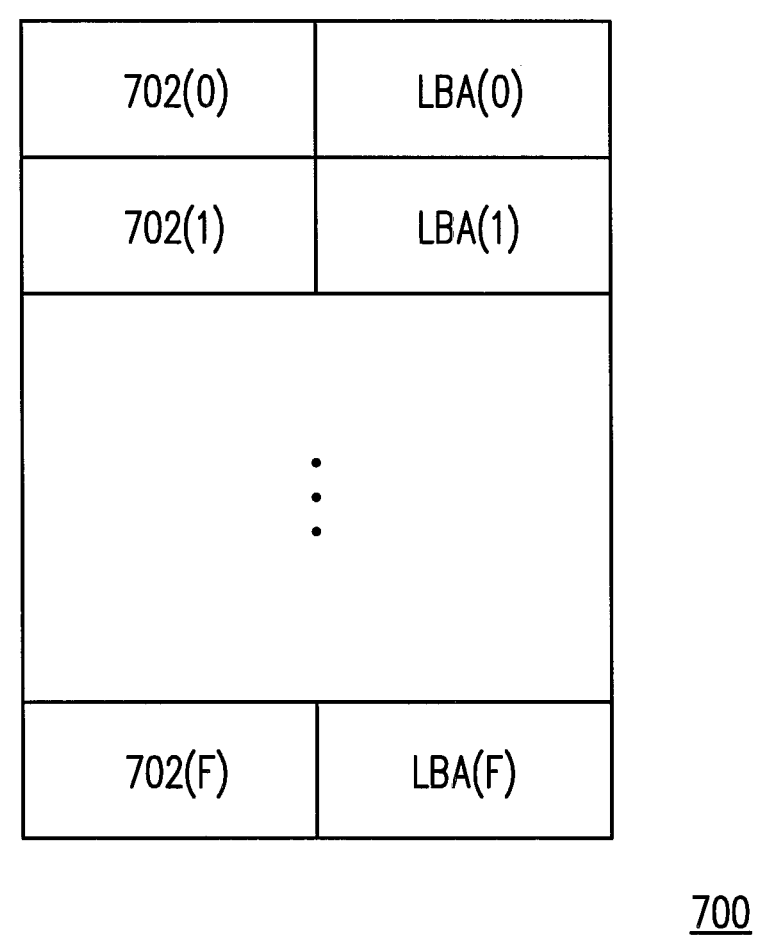

FIG. 7 illustrates an example of the accessing block table belonging to the first application according to the first exemplary embodiment.

Referring to the FIGS. 6 and 7, the memory management circuit 202 creates an accessing block table 700 belonging to the first application 602. This accessing block table 700 is used to record the mapping relationship between the virtual block addresses 702(0)~702(F) of the first virtual block address area 704 and the logical block addresses LBA(0) ~LBA(F) of the first logical block address area 708. For example, as showing in FIG. 7, the virtual block address 702(0) is mapped to the logical block address LBA(0), the virtual block address 702(1) is mapped to the logical block address LBA(1), and so on. On the other hand, the memory management circuit 202 may determine whether the virtual block address which is accessed by the first application 602 belongs to the first virtual block address area 704 according to the accessing block table 700. Specifically, the memory management circuit 202 may determine whether the virtual block address belongs to the first virtual block address area 704 according to whether the virtual block address exists in the accessing block table 700. For example, after the first application 602 issues an access command (also referred as the first access command) to the memory management circuit 202 to access the virtual block address 702(0) (also referred to as the first virtual block address). The memory management circuit 202 determines whether the virtual block address 702(0) exists in the accessing block table 700. If it is, the memory management circuit 202 determines that the virtual block address 702(0) belongs to the first virtual block address area 704. Furthermore, the memory management circuit 202 locates the logical block address LBA(0) (also referred to as the first logical block address) which the virtual block address 702(0) is mapped to. Then, the memory management circuit 202 accesses the physical block which the logical block address LBA(0) is mapped to according to the first access command. For example, after the first application 602 issues an access command to the memory management circuit 202 for accessing the virtual block address 702(J), the memory management circuit 202 determines that the virtual block address 702 (J) does not exist in the accessing block table 700. Therefore, the memory management circuit 202 determines the virtual block address 702(J) does not belong to the first virtual block address area 704, and the memory management circuit 202 would send an accessing error message to the first application 602. As a result, for the first application 602 to access the virtual block addresses that do not belong to the first application 602 can be avoided.

Similarly, as showing in FIG. 6, after the second application 604 issues an access command (referring to as a second access command) to the memory management circuit 202 to access a virtual block addresses (referring to as a second virtual block address), the memory management circuit 202 determines whether the second virtual block address belongs to the second virtual address area 706. If not, the memory management circuit 202 sends an access error message to the second application 604. If the second virtual block address belongs to the second virtual block address area 706, then the memory management circuit 202 locates the second logical block address which the second virtual block address is mapped to, and access the physical block which the second logical block address is mapped to according to the second access command. Furthermore, the memory management circuit 202 creates the accessing block table belonging to the second application 604, which is used to record the mapping relationship between the virtual block addresses in the second virtual block address area 706 and the logical block addresses in the second logical block address area 710. In other words, for each of the applications that are executed in the host system 1000, the memory management circuit 202 creates an accessing block table that is exclusive to the application to determine whether an application is accessing the virtual block addresses that does not belong to it.

In the exemplary embodiment showing in the FIG. 6, the virtual block addresses 702(0)~702(D) configured by the memory management circuit 202 are sequential. However, in another exemplary embodiment, the virtual block addresses configured by the memory management circuit 202 may be non-sequential.

Figure 8:
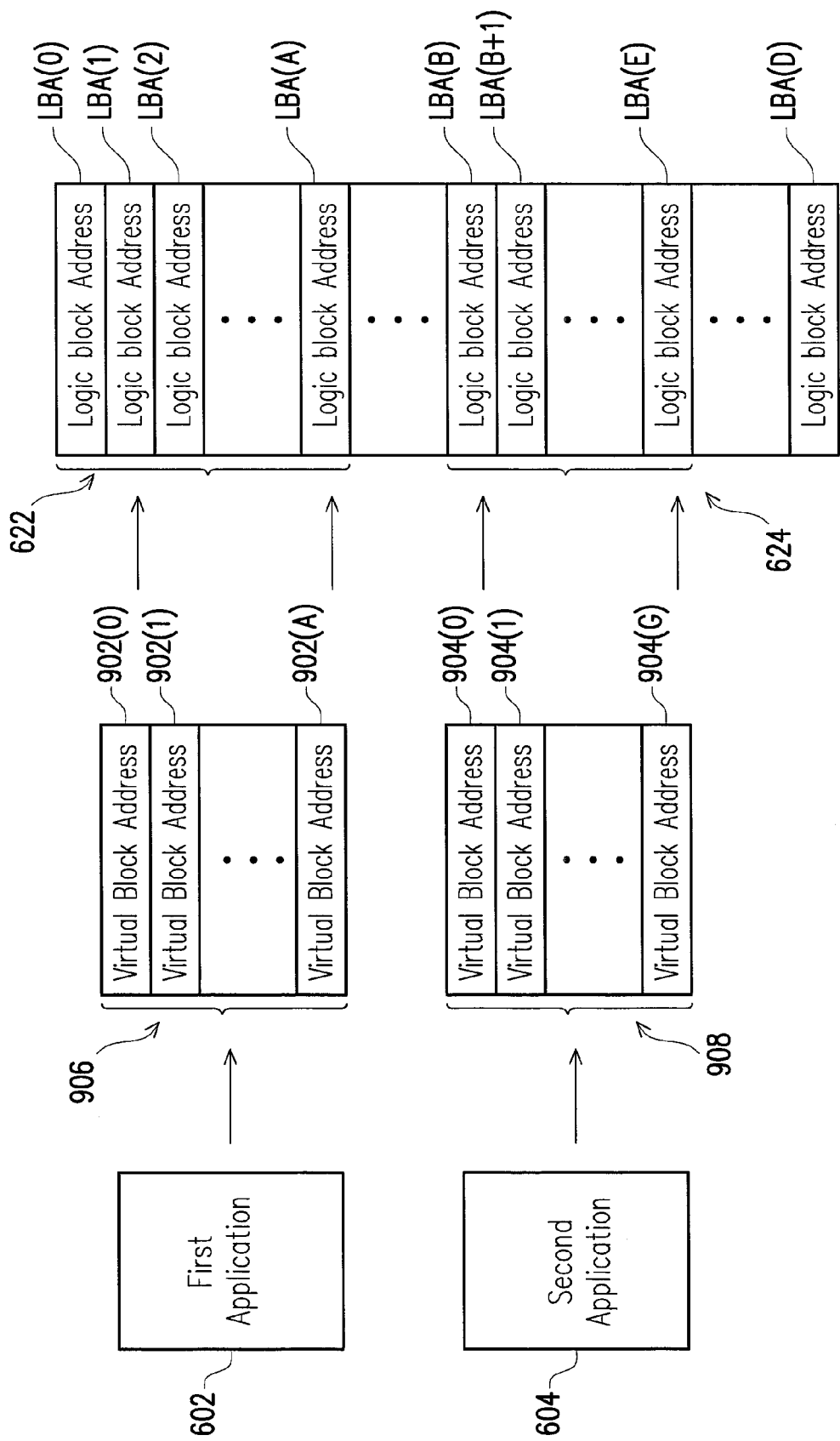
FIG. 8 is a diagram illustrating an example of non-sequential virtual block addresses according to the first exemplary embodiment.

FIG. 8 is a diagram illustrating an example with non-sequential virtual block addresses according to the first exemplary embodiment.

Referring to FIG. 8, in the exemplary embodiment showing in the FIG. 8, the memory management circuit 202 groups the sequential logical block addresses LBA(0)~LBA(A) (referred to as a third logical block address) into a first logical block address area 622. And within a plurality of virtual block addresses that are configured, the memory management circuit 202 maps the virtual block addresses 902(0)~902(A) (referred to as a third virtual block address) to the logical block addresses LBA(0)~LBA(A). The number of the virtual block addresses 902(0)~902(A) equals to the number of the logical block addresses LBA(0)~LBA(A). Furthermore, the memory management circuit 202 groups the virtual block addresses 902(0)~902(A) into the first virtual block address area 906, and allocates the first virtual block address area 906 to the first application 602. As a result, the first application 602 can issue an access command to the memory management circuit 202 to access the virtual block addresses 902(0) ~902(A). Furthermore, in this exemplary embodiment, the memory management circuit 202 records the mapping relationship between the virtual block addresses 902(0)~902(A) and the logical block addresses LBA(0)~LBA(A) in an accessing block table.

Similarly, the memory management circuit 202 groups the sequential logical block addresses LBA(B)~LBA(E) into a second logical block address area 624, and maps them to the virtual block addresses 904(0)~904(G). The memory management circuit 202 also groups the virtual block address 904(0)~904(G) into a second virtual block address area 908, and allocates the second virtual block address area 908 to the second application 604. The memory management circuit 202 also records the mapping relationship between the virtual block addresses 904(0)~904(G) and logical block addresses LBA(B)~LBA(E) in the accessing block table belonging to the second application 604.

In the exemplary embodiment showing in the FIG. 8, the virtual block addresses 902(0)~902(A) allocated to the first application 602 and the virtual block addresses 904(0)~904(G) allocated to the second application 604 are unaffiliated. In other words, the virtual block addresses are the agreement between the applications and the memory management circuit 202. For example, when the application issues an access command to the memory management circuit 202 for accessing the virtual block addresses, the memory management circuit 202 first identifies the application that issued the command. And then the memory management circuit 202 determines whether the received virtual block address belongs to the corresponding virtual block address area according to the accessing block table of the application that issued the commands. The exemplary embodiments of the invention are not limited the allocated virtual block addresses by the memory management circuit 202 to be sequential or not.

Figure 9:
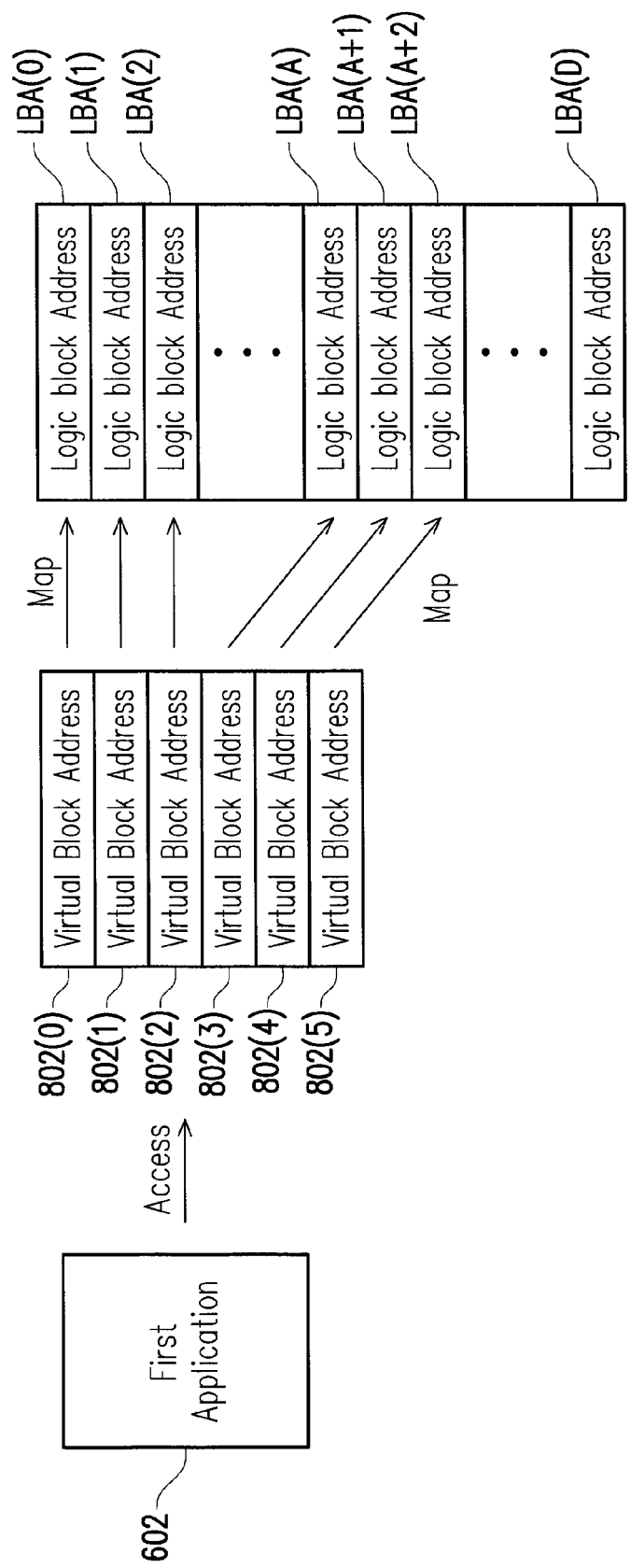
FIG. 9 is a diagram illustrating an example of non-sequential logical block addresses according to the first exemplary embodiment.

FIG. 9 is a diagram illustrating an example of non-sequential logical block addresses according to the first exemplary embodiment.

Referring to FIG. 9, in the exemplary embodiment of the FIG. 9, the memory management circuit 202 may also allocate non-sequential logical block addresses to the applications. For example, the memory management circuit 202 groups the logical block addresses LBA(0)~LBA(2) and logical block addresses LBA(A)~LBA(A+2) (referring as third logical block addresses) into a first logical block address area. The memory management circuit 202 configures a plurality of virtual block addresses, and maps the virtual block addresses 802(0)~802(5) (referring as third virtual block addresses) to the logical block address LBA(0)~LBA(2) and LBA(A)~LBA(A+2). The number of the third virtual block addresses 802(0)~802(5) equals to the number of the logical block addresses LBA (0)~LBA(2) and LBA(A)~LBA(A+2). Furthermore, the memory management circuit 202 creates an accessing block table (shown in FIG. 10) to record the mapping relationship between the first virtual block addresses 802(0)~802(5) and logical block addresses LBA(0)~LBA(2) with LBA(A)~LBA(A+2). In addition, the memory management circuit 202 groups the third virtual block addresses 802(0)~802(5) into the first virtual block address area, and allocates the first virtual block address area to the first application 602. As a result, the first application is able to access data through issuing an access command for accessing the virtual block addresses 802(0)~802(5).

Figure 11:
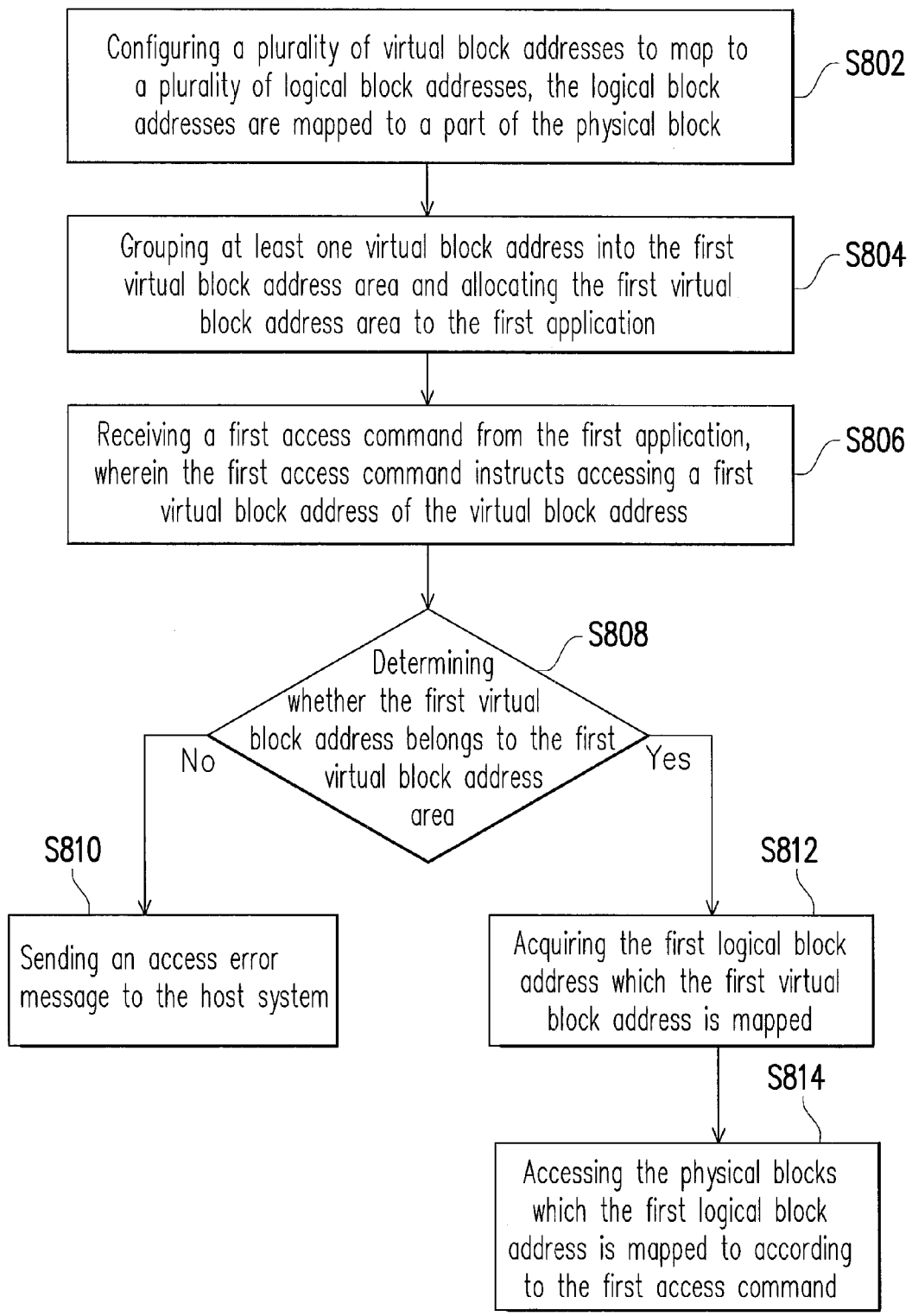
FIG. 11 is a flow chart illustrating the data protecting method according to the first exemplary embodiment.

FIG. 11 is a flow chart illustrating the data protecting method according to the first exemplary embodiment.

Referring to the FIG. 11, in the step S802, the memory management circuit 202 configures a plurality of virtual block addresses to map to a plurality of logical block addresses, and these logical block addresses are mapped to a part of the physical blocks.

In the step S804, the memory management circuit 202 groups at least one virtual block address into the first virtual block address area and allocates the first virtual block address area to the first application.

In the step S806, the memory management circuit 202 receives an access command from the first application, wherein the access command instructs accessing a first virtual block address within the virtual block addresses.

In the step S808, the memory management circuit 202 determines whether the first virtual block address belongs to the first virtual block area.

If the first virtual block address does not belong to the first virtual block address area, in the step S810, the memory management circuit 202 will send an access error message to the host system.

If the first virtual block address belongs to the first virtual block address area, in the step S812, the memory management circuit 202 obtains a first logical block address which the first virtual block address is mapped to. And then in the step S814, the memory management circuit 202 will access the physical blocks which the first logical block address is mapped to according to the first access command.

Each of the steps in the FIG. 11 are described in detail previously, therefore it is not been repeated here.

The Second Exemplary Embodiment

In the first exemplary embodiment, the memory management circuit determines whether an application is accessing the data that does not belong to itself in the virtual block addresses level. However, in the second exemplary embodiment, the memory management circuit determines whether an application is accessing the data that does not belong to itself in the logical block addresses level. In detail, in the second exemplary embodiment, the memory management circuit 202 groups at least one logical block address into a logical block address area, and allocates the logical block address area to an application. When the application issues an access command to the memory management circuit 202 for accessing the logical block addresses (referring as the first logical block address), the memory management circuit 202 determines whether the first logical block address belongs to the allocated logical block address area. Thus, the memory management circuit 202 is able to determine whether the application is accessing data that does not belong to it.

Figure 12:
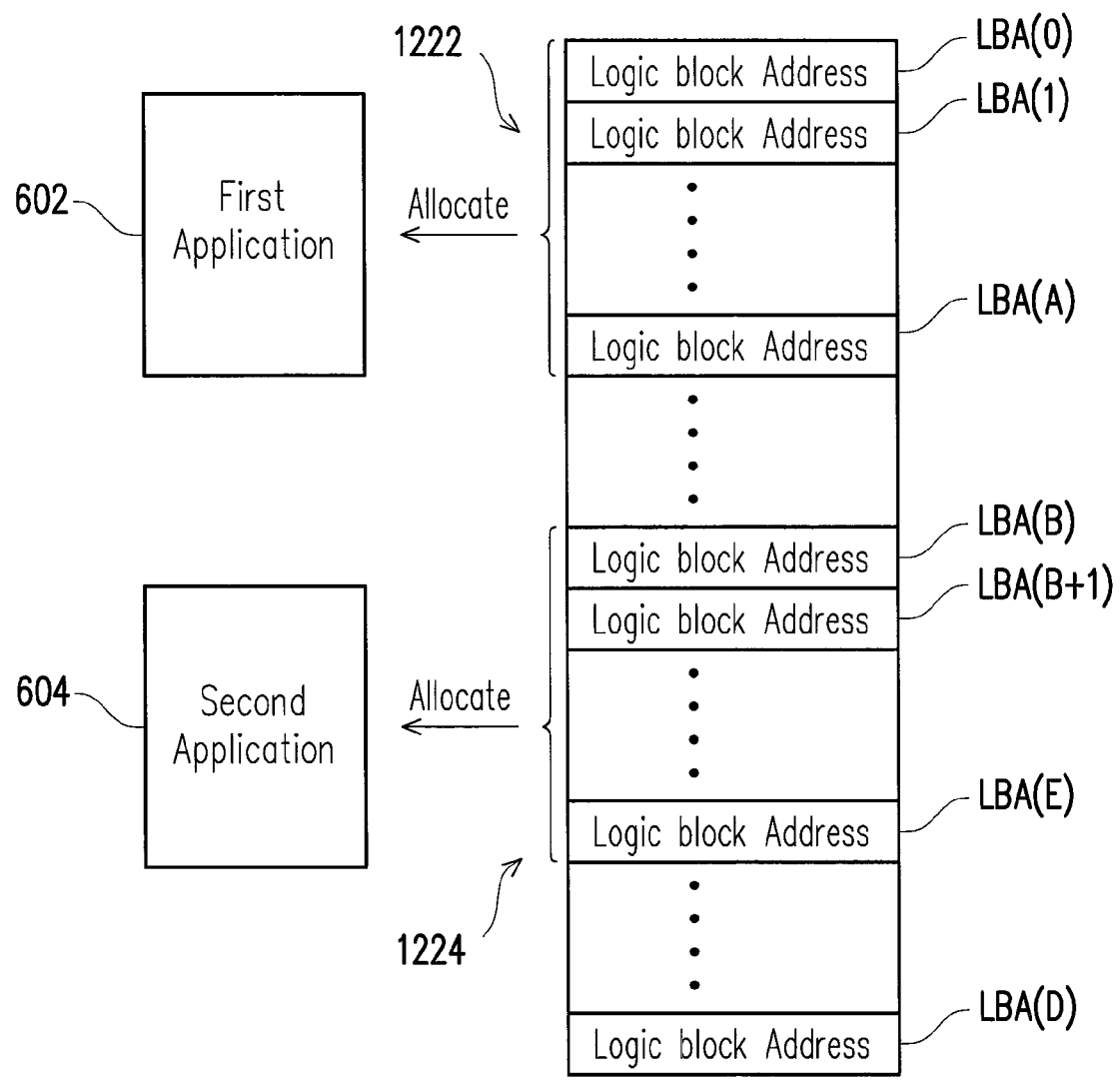
FIG. 12 is a diagram illustrating the logical block address allocated to the application according to the second exemplary embodiment.

FIG. 12 is a diagram illustrating the logical block address allocated to the application according to the second exemplary embodiment.

Referring to the FIG. 12, the memory management circuit 202 groups the logical block addresses LBA(0)~LBA(A) into a first logical block address area 1222. The first logical block address area 1222 is independently allocated to the first application 602 for accessing. In other words, the first application 602 has an exclusive right to access the logical block addresses LBA(0)~LBA(A) where other applications are unable to store data into or read data from. For example, the first application 602 accesses the logical block addresses LBA(0)~LBA(A) through a vendor command, and the operating system 1105 is unable to access logical block addresses LBA(0)~LBA(A). Particularly, the memory management circuit 202 records a plurality of columns. The columns are configured to record a plurality of permission information, wherein each permission information corresponds to a logical block addresses. The permission information is configured to indicate whether the first application 602 has the right to access the corresponding logical block addresses. In the exemplary embodiment, the memory management circuit 202 determines whether the logical block address which is to access by the first application 602 belong to the first logical block address area according to the permission information of the columns.

Figure 13:
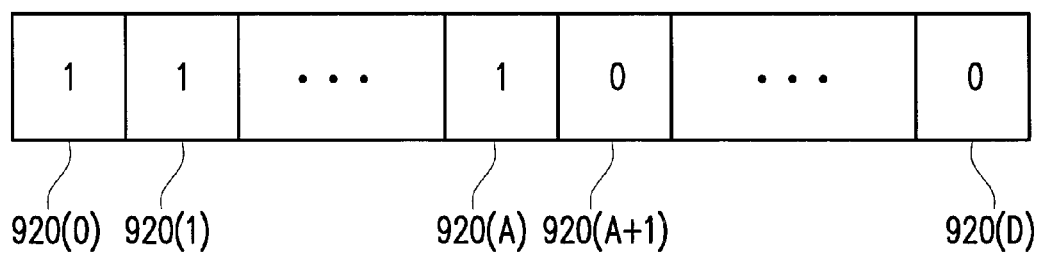
FIG. 13 is a diagram illustrating a plurality of permission information belonging to the first application according to the second exemplary embodiment.

FIG. 13 is a diagram illustrating a plurality of permission information belonging to the first application according to the second exemplary embodiment.

Referring to the FIGS. 12 and 13, the columns 920(0)~920(D) respectively correspond to the logical block addresses LBA(0)~LBA(D). In this exemplary embodiment, the permission information is represented by one bit in each of the columns. The bits indicate whether the first application 602 has permission to access the corresponding logical block addresses. For example, bit "1" indicates having permission, and bit "0" indicates no permission. For example, the logical block addresses LBA(0)~LBA(A) belong to the first logical block address area 1222, that is the first application 602 has permission to access the logical block addresses LBA(0) ~LBA(A). Therefore, the permission information in the columns 920(0)~902(A) are recorded to be "1" and other columns are recorded to be "0".

For example, when the first application 602 issues an access command to the memory management circuit 202 to access the logical block address LBA(0) the memory management circuit 202 locates the column 902(0) corresponding to the logical block address LBA(0) and reads the recorded permission information from the column 920(0). Since the permission information recorded in the column 920(0) is "1", the memory management circuit 202 determines that the logical block address LBA(0) belongs to the first logical block address area 1222. On the contrary, if the read permission information is "0", the memory management circuit 202 determines that the logical block address does not belong to the first logical block address area. After the logical block address LBA(0) belongs to the first logical block area is determined, the memory management circuit 202 will locate the physical block which the logical block address LBA(0) is mapped to according to the logical block address-physical block mapping table. The memory management circuit 202 will access the physical block which the logical block address LBA(0) is mapped to according to the first access command from the first application 602.

It should be noted that each of the columns uses bit "1" to indicate having permission in this exemplary embodiment. However, other exemplary embodiments may use bit "0" to indicate having permission, or use other words or symbols to indicate having permission or not. The invention is not limited thereto.

Similarly, as showing in FIG. 12, the memory management circuit 202 groups the logical block addresses LBA(B)~LBA (E) as a second logical block address area 1224. The second logical block address area 1124 is independently allocated to the second application 604. In other words, the second application 604 has the exclusive right to access the logical block addresses LBA(B)~LBA(E). When the second application 604 issues an access command (referring as a second command) to the memory management circuit 202 to access the logical block address (referring as a second logical block address), the memory management circuit 202 determines whether the second logical block address belongs to the second logical block address area 1224. If the second logical block address belongs to the second logical block address area 1224, the memory management circuit 202 will access the physical blocks which the second logical block address is mapped to according to the second access command. If the second logical block address does not belong to the second logical block address area 1224, then the memory management circuit 202 will send an access error message to the second application 604. The memory management circuit 202 also records a plurality of columns belonging to the second application 604, wherein the columns record the permission information belonging to the second application 604. The method of how the memory management circuit 220 determines whether the second logical block addresses belongs to the second logical block address area is identical with determining whether the first logical block addresses belongs to the second logical block address area 1222. Therefore, the descriptions will not be repeated.

Figure 14:
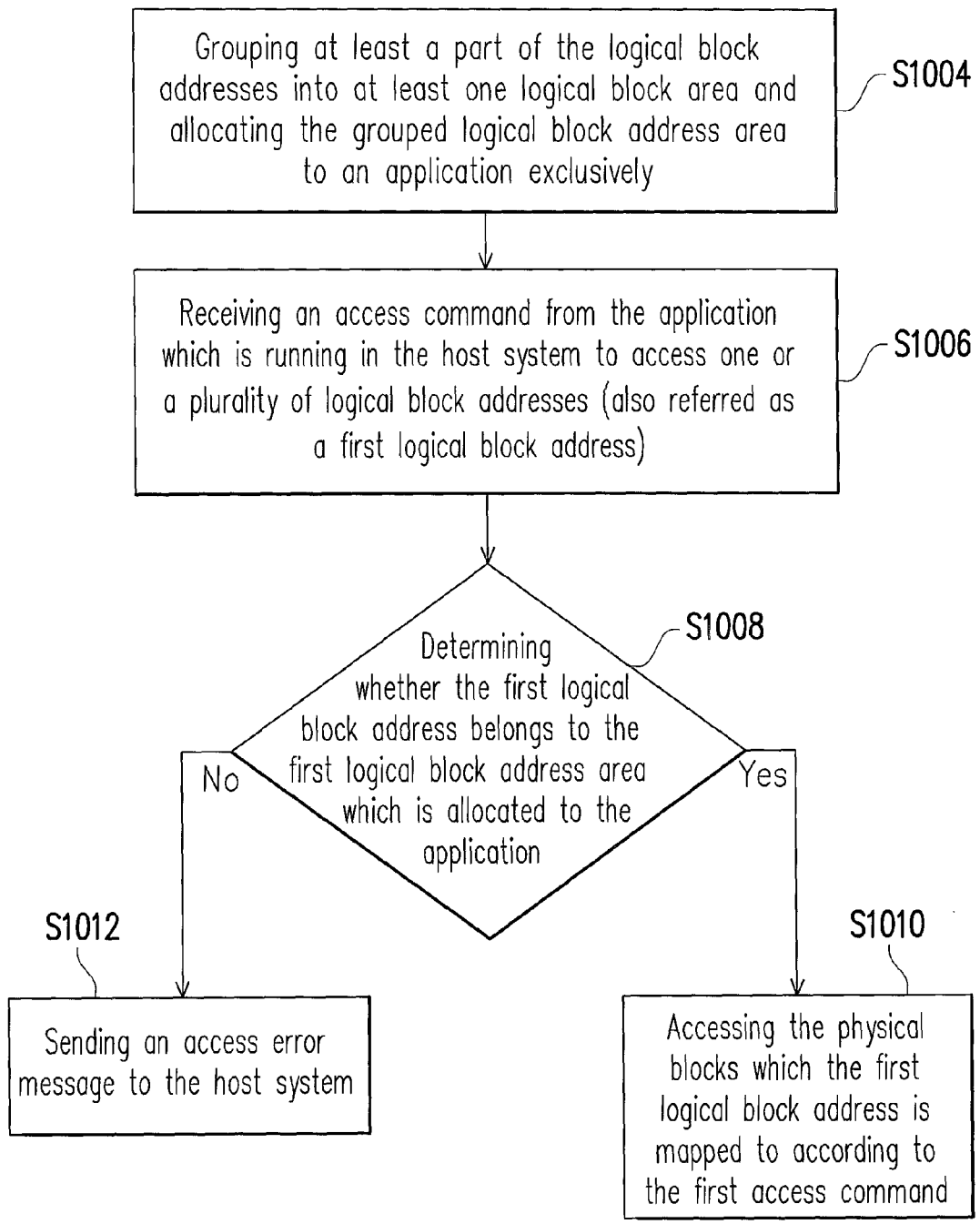
FIG. 14 is a flow chart illustrating the data protecting method according to the second exemplary embodiment.

FIG. 14 is a flow chart illustrating the data protecting method according to the second exemplary embodiment.

Referring to FIG. 14, in the step S1004, the memory management circuit 202 groups at least a part of the logical block address into at least one logical block address area and exclusively allocates the at least one logical block address area to the application. For example, as showing in the FIG. 12, parts of the logical block addresses are grouped into the first logical block address area and the second logical block address area. The first logical block address area is exclusively allocated to the first application and the second logical block address area is exclusively allocated to the second application.

In the step S1006, the memory management circuit 202 receives an access command to access one or a plurality of logical block addresses (referring as the first logical block address) from the application executed in the host system 1000.

In the step S1008, the memory management circuit 202 determines whether the first logical block address belongs to the logical block address area allocated to the application.

If the accessing address instructed by the access command belongs to the logical block address area allocated to this application, then in the step S1010, the memory management circuit 202 accesses the physical block which the first logical block address is mapped to according to the received access command.

If the accessing address instructed by the access command does not belong to the allocated logical block address area of the application, in the step S1012, the memory management circuit 202 will send an access error message to the host system. For example, when the logical block address accessed by the first application does not belong to the first logical block address area, the memory management circuit 202 sends an access error message to the first application. When the logical block addresses requested by the second application does not belong to the second logical block address area, the memory management circuit 202 sends an access error message to the second application.

In summary, a data protecting method, the memory controller and the memory storage device provided by the exemplary embodiments of the invention is to determine whether the application is accessing data that does not belong to itself in the virtual block addresses level or the logical block addresses level. As a result, an application will not access the data belonging to other applications so as to protect the data exclusively owned by each application.

The previously described exemplary embodiments of the invention have the advantages aforementioned, wherein the advantages aforementioned not required in all versions of the disclosure.

It will be apparent to those skilled in the art that various modifications and variations can be made to the structure of the present disclosure without departing from the scope or spirit of the invention. In view of the foregoing, it is intended that the disclosure cover modifications and variations of this disclosure provided they fall within the scope of the following claims and their equivalents.

What is claimed is:

1. A data protecting method, for a rewritable non-volatile memory module, wherein the rewritable non-volatile memory module comprises a plurality of physical blocks, a plurality of logical block addresses are configured to map to a part of the physical blocks, the data protecting method comprising:
configuring a plurality of virtual block addresses to map to the logical block addresses;
grouping at least one virtual block address of the virtual block addresses into a first virtual block address area and allocating the first virtual block address area to a first application, wherein the at least one virtual block address is mapped to at least one logical block address, and the first virtual block address area is mapped to a first logical block address area;
receiving a first access command from the first application, wherein the first access command instructs accessing a first virtual block address of the virtual block addresses;
determining whether the first virtual block address belongs to the first virtual block address area; and
if the first virtual block address does not belong to the first virtual block address area, sending an access error message to the first application.

2. The data protecting method according to claim 1 further comprising:
if the first virtual block address belongs to the first virtual block address area, obtaining a first logical block address of the logical block addresses which the first virtual block address is mapped to; and
accessing the physical block which the first logical block address is mapped to according to the first access command.

3. The data protecting method according to claim 1 further comprising:
grouping at least another one virtual block address of the virtual block addresses into a second virtual block address area and allocating the second virtual block address area to a second application;
receiving a second access command from the second application, wherein the second access command instructs accessing a second virtual block address of the virtual block addresses;
determining whether the second virtual block address belongs to the second virtual block address area; and
if the second virtual block address does not belong to the second virtual block address area, sending an access error message to the second application.

4. The data protecting method according to claim 1 further comprising:
creating an accessing block table, wherein the accessing block table records a mapping relationship between the virtual block addresses of the first virtual block address area and the logical block addresses of the first logical block address area,
wherein the step of determining whether the first virtual block address belongs to the first virtual block address area comprises:
determining whether the first virtual block address belongs to the first virtual block address area according to the accessing block table.

5. The data protecting method according to claim 1, wherein the number of the at least one virtual block address equals to the number of the at least one logical block address, and the at least one logical block address is non-sequential.

6. A memory storage device, comprising:
a connector, configured to be coupled to a host system;
a rewritable non-volatile memory module, comprising a plurality of physical blocks, wherein a plurality of logical block addresses are configured to map to a part of the physical blocks; and
a memory controller, coupled to the connector and rewritable non-volatile memory module, configured to group at least one logical block address of the logical block addresses into a first logical block address area and allocating the first logical block address area to a first application,
wherein the memory controller is configured to receive a first access command from the first application, wherein the first access command instructs accessing at least one first logical block address,
wherein the memory controller is further configured to determine whether the at least one first logical block address belongs to the first logical block address area, if the at least one first logical block address does not belong to the first logical block address area, the memory controller is configured to send an access error message to the first application.

7. The memory storage device according to claim 6, wherein if the at least one first logical block address belongs to the first logical block address area, the memory controller is configured to access a physical block which the at least one first logical block address is mapped to according to the first access command.

8. The memory storage device according to claim 7, wherein the memory controller is further configured to group at least another one logical block address of the logical block addresses into a second logical block address area, allocate the second logical block address area to a second application, and receive a second access command from the second application, wherein the second access command instructs accessing at least one second logical block address of the logical block addresses,
wherein the memory controller is further configured to determine whether the at least one second logical block address belongs to the second logical block address area, if the at least one second logical block address does not belong to the second logical block address area, the memory controller is configured to send the access error message to the second application.

9. The memory storage device according to claim 7, wherein the memory controller is further configured to respectively record a plurality of permission information corresponding to the logical block addresses belonging to the first application, wherein each of the permission information indicates whether the first application has permission to access the corresponding logical block addresses, and the logical block addresses which are able to be accessed by the first application belong to the first logical block address area, wherein the memory controller is further configured to determine whether the at least one first logical block address belongs to the first logical block address area according to the permission information.

10. A memory controller, for controlling a rewritable non-volatile memory module, wherein the rewritable non-volatile memory module comprises a plurality of physical blocks, a plurality of logical block addresses is configured to map to a part of the physical blocks, the memory controller comprising:

a host interface, configured to couple to a host system;

a memory interface, coupled to the rewritable non-volatile memory module; and a memory management circuit, coupled to the host interface and memory interface, configured to configure a plurality of virtual block addresses to map to the logical block addresses, wherein the memory management circuit is further configured to group at least one virtual block address of the virtual block addresses into a first virtual block address area and allocates the first virtual block address area to a first application, wherein the at least one virtual block address is mapped to at least one logical block address, and the first virtual block address area is mapped to a first logical block address area, wherein the memory management circuit is further configured to receive a first access command from the first application, wherein the first access command instructs accessing a first virtual block address of the virtual block addresses, wherein the memory management circuit is further configured to determine whether the first virtual block address belongs to the first virtual block address area, if the first virtual block address does not belong to the first virtual block address area, the memory management circuit is configured to send an access error message to the first application.

11. The memory controller according to claim 10, wherein if the first virtual block address belongs to the first virtual block address area, the memory management circuit is configured to obtain a first logical block address of the logical block addresses which the first virtual block address is mapped to, and access a physical block which the first logical block address is mapped to according to the first access command.

12. The memory controller according to claim 10, wherein the memory management circuit is further configured to group at least another one virtual block address of the virtual block addresses into a second virtual block address area and allocate the second virtual block address area to a second application, and receive a second access command from the second application, wherein the second access command instructs accessing a second virtual block address of the virtual block addresses, the memory management circuit is further configured to determine whether the second virtual block address belongs to the second virtual block address area, if the second virtual block address does not belong to the second virtual block address area, the memory management circuit is configured to send the access error message to the second application.

13. The memory controller according to claim 10, wherein the memory management circuit is further configured to create an accessing block table, and the accessing block table records a mapping relationship between the virtual block addresses of the first virtual block address area and the logical block addresses of the first logical block address area, the memory management circuit is further configured to determine whether the first virtual block address belongs to the first virtual block address area according to the accessing block table.

14. The memory controller according to claim 10, wherein the number of the at least one virtual block address equals to the number of the at least one logical block address, and the at least one logical block address is non-sequential.

\* \* \* \* \*